US009154667B2

(12) United States Patent
Sakatani

(10) Patent No.: US 9,154,667 B2
(45) Date of Patent: Oct. 6, 2015

(54) CALIBRATION APPARATUS AND METHOD FOR CALIBRATING IMAGE READING APPARATUS

(71) Applicant: Konica Minolta, Inc., Chiyoda-ku (JP)

(72) Inventor: Kazuomi Sakatani, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/596,353

(22) Filed: Jan. 14, 2015

(65) Prior Publication Data

US 2015/0201110 A1  Jul. 16, 2015

(30) Foreign Application Priority Data

Jan. 15, 2014 (JP) ................................. 2014-004994

(51) Int. Cl.
*H04N 1/46* (2006.01)
*H04N 1/60* (2006.01)
*H04N 1/00* (2006.01)

(52) U.S. Cl.
CPC ......... *H04N 1/6044* (2013.01); *H04N 1/00002* (2013.01); *H04N 1/00045* (2013.01); *H04N 1/00087* (2013.01); *H04N 2201/0094* (2013.01)

(58) Field of Classification Search
CPC ............ H04N 1/6044; H04N 1/00002; H04N 1/00045; H04N 1/00087; H04N 2201/0094
See application file for complete search history.

(56) References Cited

U.S. PATENT DOCUMENTS 6,963,424 B1 * 11/2005 Higuchi .......................... 358/1.9
2006/0215239 A1 * 9/2006 Iannazzi ........................ 358/504

FOREIGN PATENT DOCUMENTS

JP      2002-262007 A      9/2002

* cited by examiner

*Primary Examiner* — Quang N Vo
(74) *Attorney, Agent, or Firm* — Buchanan Ingersoll & Rooney PC

(57) ABSTRACT

A calibration apparatus includes a calibration section and a conversion section. The calibration section performs calibration with first and second image reading apparatuses which read in-line a color patch formed on paper by an image forming apparatus. The first image reading apparatus includes a first device which reads the color patch and outputs the reading result as a first signal. The second image reading apparatus includes a second device which reads the color patch and outputs the reading result as a second signal having a format different from a format of the first signal. The conversion section converts the first signal into an after-conversion first signal having the format of the second signal. The calibration section performs the calibration in such a way that an output value of the second signal is adjusted to an output value of the after-conversion first signal.

7 Claims, 6 Drawing Sheets

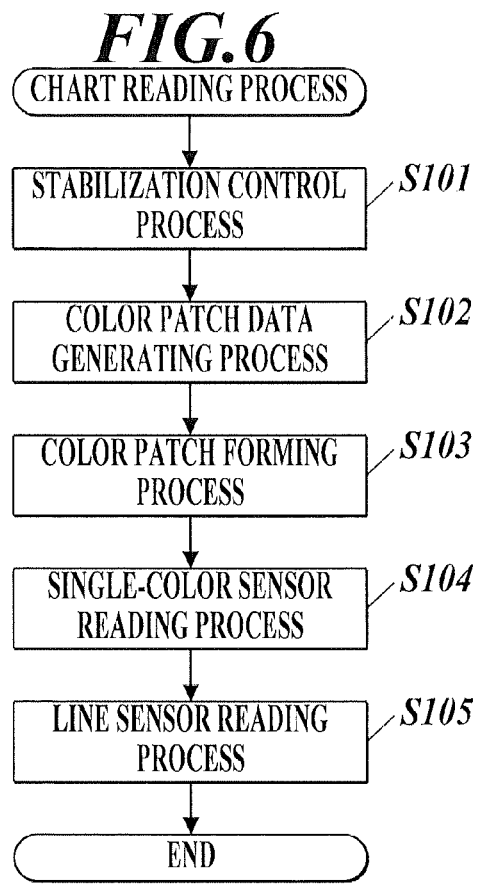
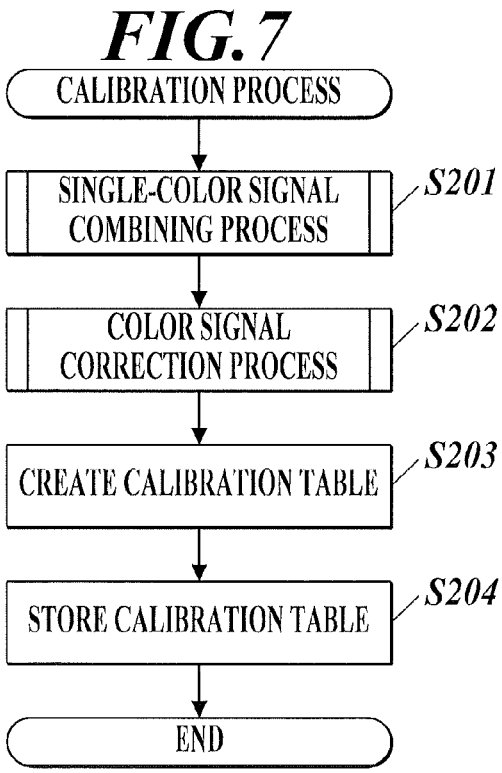

FIG.8
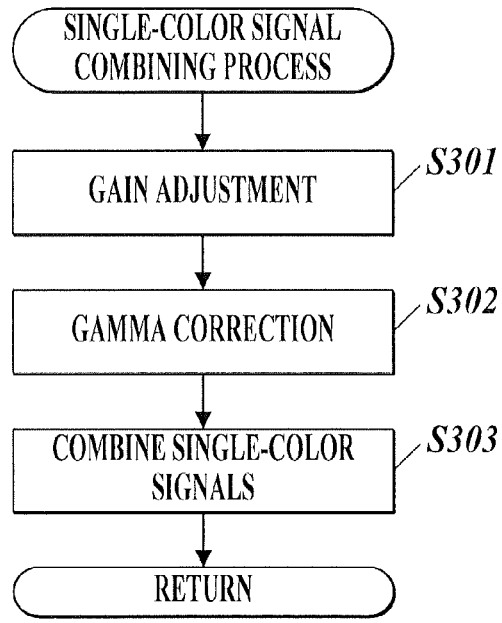
FIG.9
GAIN ADJUSTMENT TABLE
| R | 0.94 |
|---|------|
| G | 1.01 |
| B | 1.00 |
FIG.10
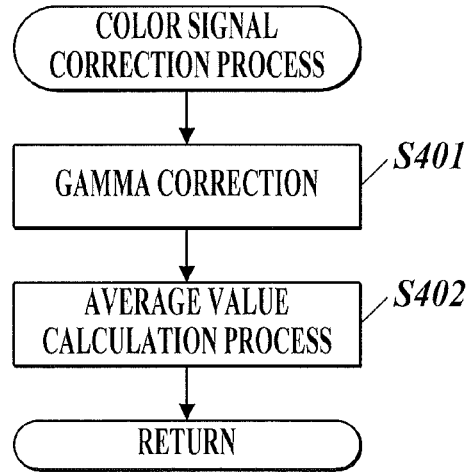

CALIBRATION APPARATUS AND METHOD FOR CALIBRATING IMAGE READING APPARATUS

FIELD OF THE INVENTION

The present invention relates to a calibration apparatus and a method for calibrating an image reading apparatus.

DESCRIPTION OF THE RELATED ART

Conventionally, in the case where a color profile of an image forming apparatus is created, an image reading apparatus including a line sensor(s) which reads in full color, such as a CCD (Charge Coupled Device) and/or a CIS (Contact Image Sensor), is disposed in-line in order to increase productivity, and the line sensor reads a color chart constituted of a large number of colors formed on paper, so that automatic creation of a color profile is realized.

These line sensors, for example, have instrumental errors and deteriorate over time. Hence, output values of signals output by reading a color chart may be different depending on line sensors. Therefore, an image reading apparatus needs to be calibrated at the time of installation or regularly so as to obtain output values of a certain level.

However, in conventional calibration, it is necessary that an image forming apparatus forms a color patch on paper, an image reading apparatus thereof reads the color patch, a colorimeter performs colorimetry of the color patch on the output paper, and the image reading apparatus is calibrated in such a way that the reading result of the image reading apparatus is adjusted to the colorimetry result of the colorimeter. This reduces productivity of the image forming apparatus and increases labor costs.

As a method for calibrating an image reading apparatus without using a colorimeter, there is described, for example, in Japanese Patent Application Laid-Open Publication No. 2002-262007 (hereinafter "Patent Document 1") creating a correction table to adjust an input image from a scanner as a calibration target to a reference image which is an input image from a specific scanner and calibrating the scanner as the calibration target on the basis of the created correction table.

The invention of Patent Document 1 uses a plurality of sensors which are the same type, for example, CCDs or a CCD and a CIS. The invention of Patent Document 1 corrects an instrumental error between these sensors. As described above, line sensors have instrumental errors. Hence, if no adjustment is performed on a line sensor at the time of installation, reliability of the sensor is unknown. That is, a line sensor cannot be used without adjustment, and therefore the specific scanner needs to be calibrated with a colorimeter so as to obtain output values of a certain level.

Considering that an image reading apparatus is disposed in-line, it is practically impossible to allow a printed calibration chart to pass on a paper conveyance path. That is, this type of image reading apparatus reads only images formed by an image forming apparatus provided with this image reading apparatus. It is possible that the image forming apparatus creates a calibration chart and the image reading apparatus is calibrated using this chart. However, color reproducibility of a calibration chart varies depending on image forming apparatuses. Therefore, in this case too, it is necessary that a colorimeter performs colorimetry of the calibration chart, which is formed by the image forming apparatus, for creation of a profile, and the image reading apparatus is calibrated on the basis of the created profile.

BRIEF SUMMARY OF THE INVENTION

Objects of the present invention include providing a calibration apparatus and a method for calibrating an image reading apparatus each of which calibrates an image reading apparatus without reducing productivity.

In order to achieve at least one of the objects, according to an aspect of the preset invention, there is provided a calibration apparatus including: a calibration section which performs calibration with a first image reading apparatus and a second image reading apparatus which read in-line a color patch formed on paper by an image forming apparatus which forms an image on paper; and an image signal conversion section, wherein the first image reading apparatus includes a first device which reads the color patch and outputs a result of the reading as a first signal, the second image reading apparatus includes a second device which reads the color patch and outputs a result of the reading as a second signal having a signal format different from a signal format of the first signal, the image signal conversion section converts the first signal into an after-conversion first signal having the signal format of the second signal, and the calibration section performs the calibration in such a way that an output value of the second signal is adjusted to an output value of the after-conversion first signal.

Preferably, in the calibration apparatus, the first device is constituted of a plurality of single-color sensors which read the color patch at different positions and output the first signals of different channels.

Preferably, in the calibration apparatus, the single-color sensors are constituted of: a first single-color sensor which emits red light to the color patch, receives the light reflected by the color patch, and outputs the first signal corresponding to an amount of the received light; a second single-color sensor which emits green light to the color patch, receives the light reflected by the color patch, and outputs the first signal corresponding to an amount of the received light; and a third single-color sensor which emits blue light to the color patch, receives the light reflected by the color patch, and outputs the first signal corresponding to an amount of the received light.

Preferably, in the calibration apparatus, the single-color sensors are disposed in a direction perpendicular to a conveyance direction of the paper, and the color patch is constituted of a color pattern having a length enough for the single-color sensors to read the color pattern simultaneously.

Preferably, in the calibration apparatus, the second device is constituted of a line sensor which reads the color patch in full color and outputs the result of the reading as the second signal which is a color signal.

Preferably, in the calibration apparatus, the color patch is constituted of color patterns of 228 colors conforming to IT8.7/2.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein:

FIG. 6 is a flowchart of a chart reading process;

FIG. 7 is a flowchart of a calibration process;

FIG. 8 is a flowchart of a single-color signal combining process;

FIG. 9 shows a gain adjustment table; and

FIG. 10 is a flowchart of a color signal correction process.

DETAILED DESCRIPTION OF THE INVENTION

Hereinafter, an embodiment of the present invention is described with reference to the drawings. The scope of the present invention is not limited to the illustrated examples.

Figure 1:
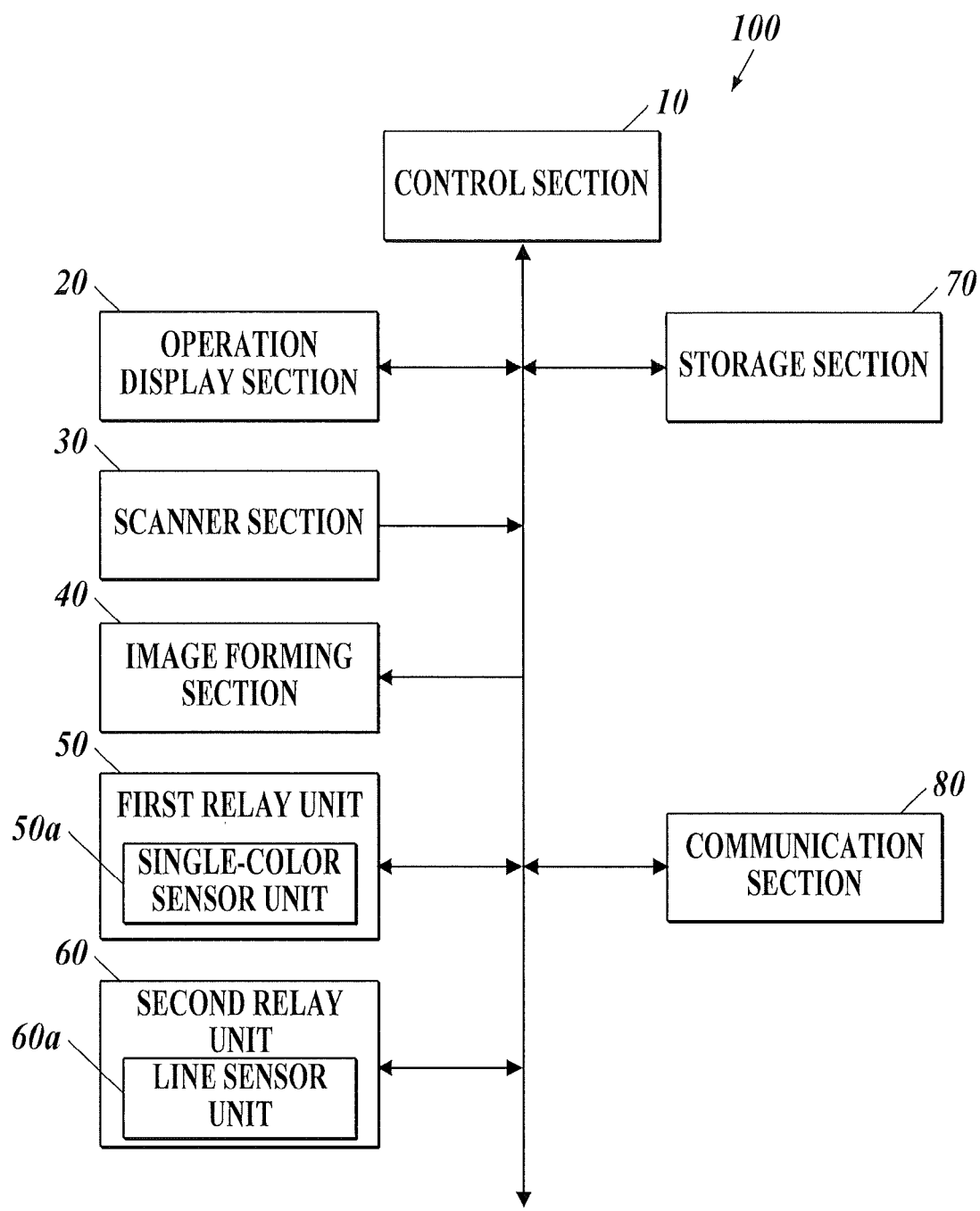
FIG. 1 is a block diagram showing the functional configuration of an image forming apparatus.

FIG. 1 shows the functional configuration of an image forming apparatus 100 according to an embodiment of the present invention. The image forming apparatus 100 is an electrophotographic color image forming apparatus as a multifunction peripheral having a copier function, a scanner function and a printer function.

The image forming apparatus 100 includes, for example, as shown in FIG. 1, a control section 10, an operation display section 20, a scanner section 30, an image forming section 40, a first relay unit 50, a second relay unit 60, a storage section 70 and a communication section 80 which are connected to each other via a bus.

The control section 10 includes a CPU (Central Processing Unit), a ROM (Read Only Memory) and a RAM (Random Access Memory). In response to operation signals input from the operation display section 20 or instruction signals received through the communication section 80, the CPU reads a system program and various process programs stored in the ROM, opens the read programs on the RAM and performs centralized control on the components of the image forming apparatus 100 according to the opened programs.

The operation display section 20 is constituted of an LCD (Liquid Crystal Display) and displays, on a display screen, various operation buttons, states of the apparatus, action states of each function and the like according to instructions of display signals input from the control section 10. The display screen of the LCD is covered with a pressure sensitive (resistive film type) touch panel constituted of transparent electrodes arranged in a lattice. The operation display section 20 detects coordinates of points on the touch panel as voltage values, the points being pressed by a finger, a touch pen or the like, and outputs the detected position signals (i.e. the voltage values) as operation signals to the control section 10. The operation display section 20 includes number buttons and various operation buttons such as a start button and outputs operation signals made by button operation to the control section 10.

The scanner section 30 includes a scanner under a contact glass on which documents are placed and reads images of the documents. The scanner includes a light source, a CCD (Charge Coupled Device) image sensor and an A/D converter. The scanner reads images of the documents as RGB signals by forming images with reflected light of light emitted from the light source to illuminate and scan the documents and performing photoelectric conversion on the images formed of the reflected light and generates image data by performing A/D conversion on the read images.

The image forming section 40 forms and outputs images on paper with electrophotography on the basis of yellow (Y), magenta (M), cyan (C) and black (K) image data.

Figure 2:
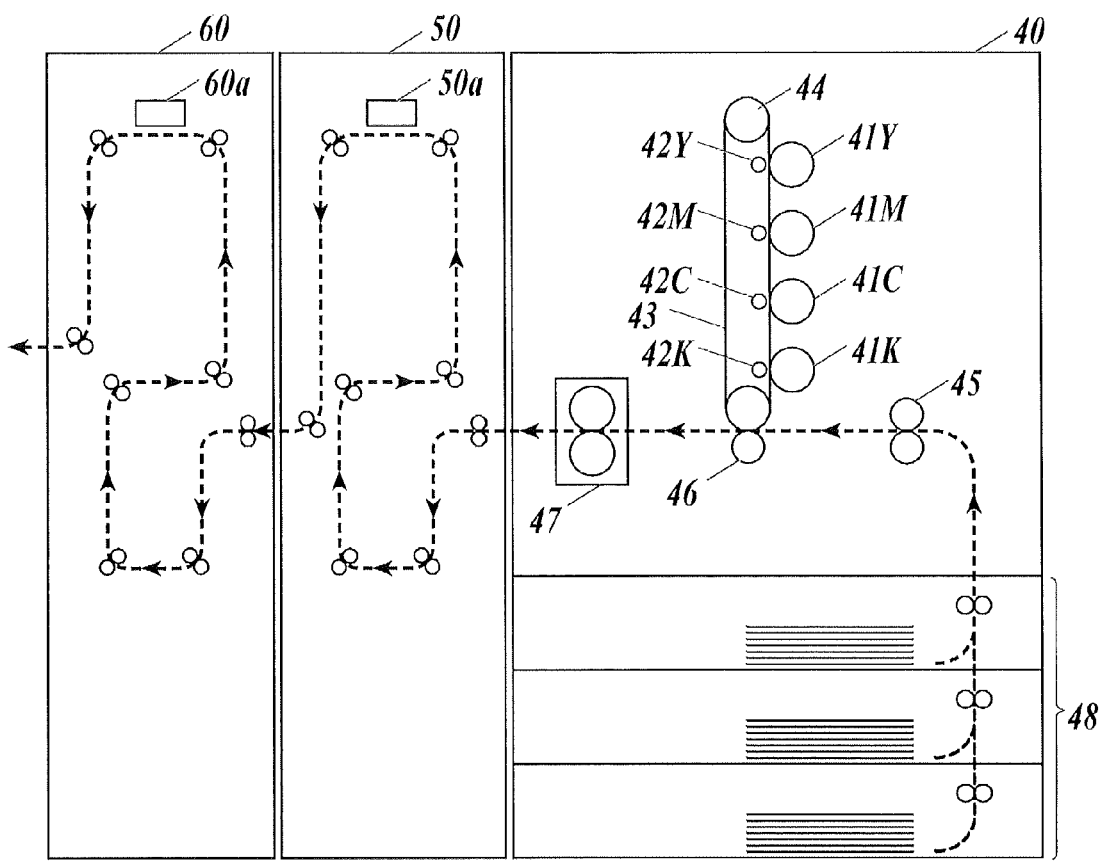
FIG. 2 is a schematic cross-sectional view of the image forming apparatus.

As shown in FIG. 2, the image forming section 40 includes, for Y, M, C and K, photosensitive drums 41Y, 41M, 41C and 41K, primary transfer rollers 42Y, 42M, 42C and 42K, an intermediate transfer belt 43, a roller 44, a resist roller 45, a secondary transfer roller 46, a fixing unit 47 and a paper feeding section 48.

Here, image formation in the image forming section 40 is described.

The photosensitive drum 41Y rotates, the surface thereof is charged by a charger (not shown), and a latent image of Y data is formed on the charged area by being exposed by a laser light source (not shown) or the like. Then, on the area where the latent image is formed, a yellow toner image is formed by a developing device (not shown). The yellow toner image is transferred to the intermediate transfer belt 43 by the photosensitive drum 41Y and the primary transfer roller 42Y pressing against each other. The yellow toner image is a yellow image corresponding to yellow image data of an output target. The toner not transferred to the intermediate transfer belt 43 is removed by a cleaner (not shown).

In the same way as the yellow toner image, each of magenta, cyan and black toner images is formed and transferred to the intermediate transfer belt 43.

Rotation of the roller 44 and the primary transfer rollers 42Y, 42M, 42C and 42K rotates the intermediate transfer belt 43, and the Y, M, C and K toner images are successively transferred to the intermediate transfer belt 43, thereby being superposed thereon. The paper feeding section 48 includes a plurality of paper feeding trays and feeds paper housed in the paper feeding trays to the image forming section 40. Rotation of the resist roller 45 carries the paper fed from the paper feeding trays of the paper feeding section 48 to the secondary transfer roller 46.

As the resist roller 45 and the secondary transfer roller 46 rotate, the paper passes through a nip part formed by the secondary transfer roller 46, so that the YMCK toner image on the intermediate transfer belt 43 is transferred to the paper. The paper to which the YMCK toner image is transferred passes through the fixing unit 47. Pressurization and heating with the fixing unit 47 fixes the YMCK toner image to the paper, thereby forming a color image. The paper on which image formation has been performed is ejected to the first relay unit 50.

In the case of double-sided printing, the paper, on one side of which image formation has been performed, is reversed by a double-side conveyance unit (not shown) for double-sided printing and carried to the secondary transfer roller 46 by the resist roller 45 so that image formation is performed on the other side on which image formation has not been performed yet.

The first relay unit 50 has a function to receive the paper ejected from the image forming section 40 and send the paper outside for further processing. The first relay unit 50 includes a single-color sensor unit 50a in a route. The first relay unit 50 may have a finisher function to perform various processes such as a punching process, a folding process and a cutting process.

The single-color sensor unit 50a reads color patterns of a color patch formed on and fixed to paper by the image forming section 40 and outputs voltage values corresponding to the reading results to the control section 10.

The control section 10 detects colors of the color patterns on the basis of the voltage values output from the single-color sensor unit 50a.

Figure 3A:
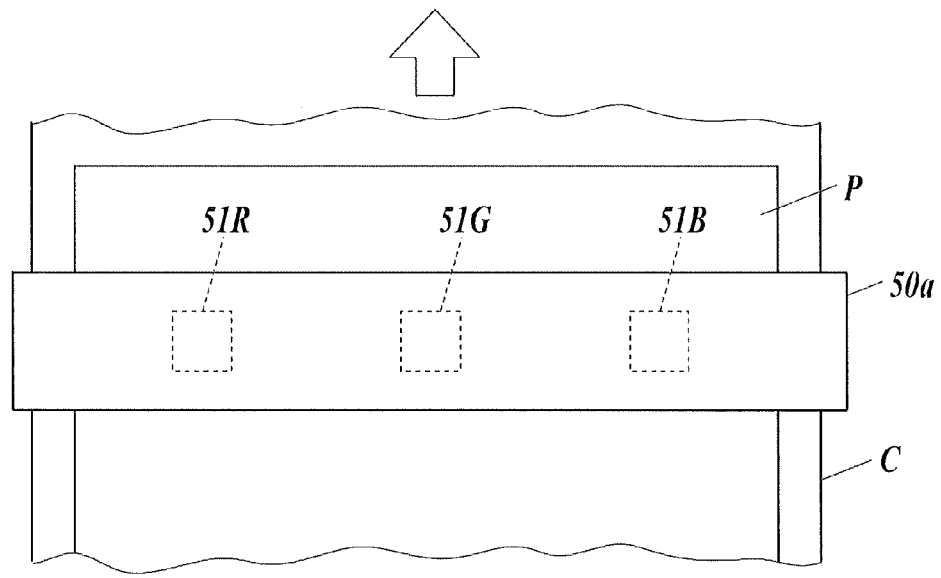
FIG. 3A is an enlarged planar view of a single-color sensor unit.
Figure 3B:
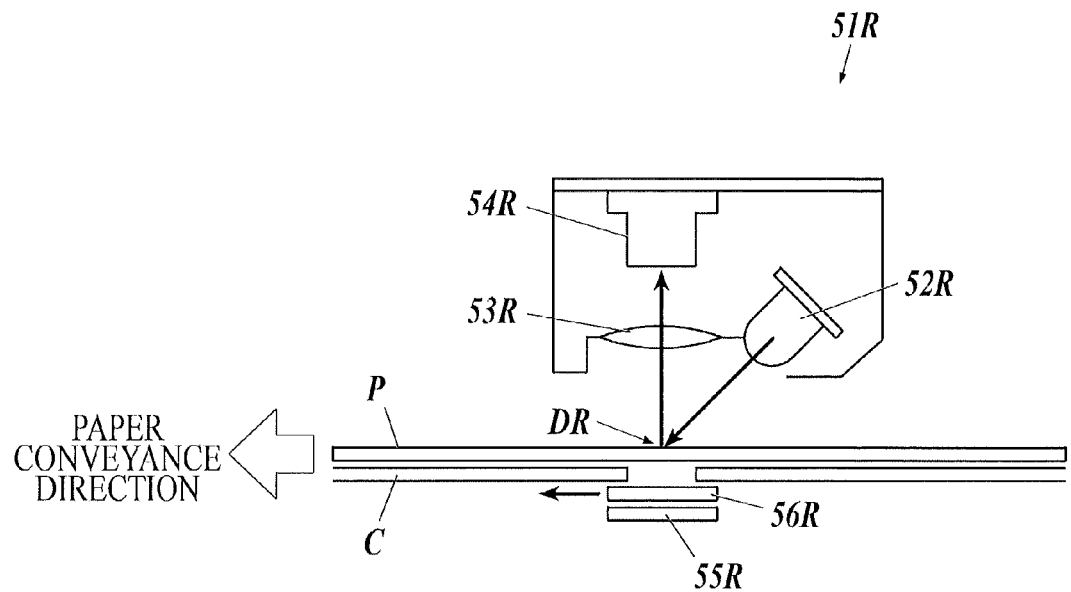
FIG. 3B is a schematic side view of a single-color sensor (R)

FIGS. 3A and 3B show the schematic configuration of the single-color sensor unit 50a. FIG. 3A is an enlarged planar view of the single-color sensor unit 50a disposed on a paper conveyance path C.

The single-color sensor unit 50a includes, as shown in FIG. 3A, a single-color sensor (R) 51R, a single-color sensor (G) 51G and a single-color sensor (B) 51B arranged in a line parallel to a main-scanning direction of paper P at predetermined intervals. The arrangement of the single-color sensors is not limited to the one shown in FIG. 3A, and therefore they can be properly arranged. Insofar as the single-color sensor (R) 51R, the single-color sensor (G) 510 and the single-color sensor (B) 51B are arranged at different positions in the main-scanning direction, unlike the embodiment, it is unnecessary that they are arranged at the same position in a sub-scanning direction.

FIG. 3B is a schematic side view of the single-color sensor (R) 51R. The single-color sensor (R) 51R, the single-color sensor (G) 51G and the single-color sensor (B) 51B have the same configuration, and therefore the schematic configuration of the single-color sensor (R) 51R is described hereinafter and description of the schematic configurations of the other single-color sensors is omitted.

The single-color sensor (R) 51R includes an LED (Light Emitting Diode) 52R, a lens 53R, a light receiving element 54R, a white reference plate 55R and a reference plate cover 56R.

The LED 52R is an emitter to emit red light. Note that the single-color sensor (G) 51G includes an LED 52G which is an emitter to emit green light, and the single-color sensor (B) 51B includes an LED 52B which is an emitter to emit blue light. The center wavelengths of the red light, green light and blue light emitted from the LEDs 52R, 52G and 52B, respectively, are different from each other. The red light emitted from the LED 52R is easily absorbed by cyan, the green light emitted from the LED 52G is easily absorbed by magenta, and the blue light emitted from the LED 52B is easily absorbed by yellow. That is, a color having a complementary color relationship with a luminescent color has a property to easily absorb light of the luminescent color. Note that black has a property to absorb light of any color. In the embodiment, LEDs are used as emitters. Alternatively, other types, such as EL (Electronic Luminescence), of light emitting elements may be used.

The lens 53R condenses light emitted from the LED 52R. The light receiving element 54R is constituted of, for example, a photodiode, and converts the amount of light received into voltage values to output. The white reference plate 55R is a reflective plate not to absorb but to reflect the light emitted from the LED 52R and is used for shading correction. The reference plate cover 56R prevents the white reference plate 55R from being dirty with, for example, paper powder from paper when the white reference plate 55R is not in use. The reference plate cover 56R is displaced from a covering position to cover the white reference plate 55R to an open position when the white reference plate 55R is used.

The single-color sensor (R) 51R thus configured emits light from the LED 52 to each color pattern of the color patch formed on the paper P, which is carried on the paper conveyance path C, when each color pattern passes through a measurement position DR, and receives the reflected light with the light receiving element 54R through the lens 53R. Then, the light receiving element 54R outputs a voltage value corresponding to the amount of the reflected light to the control section 10. On the basis of the voltage value, an output value from the single-color sensor (R) 51R is determined. The single-color sensor (R) 51R thus reads a color chart in the embodiment. The single-color sensor (G) 51G and the single-color sensor (B) 51B read the color chart in the same way as the single-color sensor (R) 51R. For the single-color sensor (R) 51R, the single-color sensor (G) 51G and the single-color sensor (B) 51B, measurement positions DR, DG and DB are predetermined, respectively.

The second relay unit 60 has a function to receive the paper ejected from the first relay unit 50 and send the paper outside for further processing. The second relay unit 60 includes a line sensor unit 60a disposed in the route. The second relay unit 60 may have a finisher function to perform various processes such as a punching process, a folding process and a cutting process. In the embodiment, the second relay unit 60 is provided in the image forming apparatus 100 by being optionally installed therein, but may be provided in the image forming apparatus 100 from the beginning.

Figure 4:
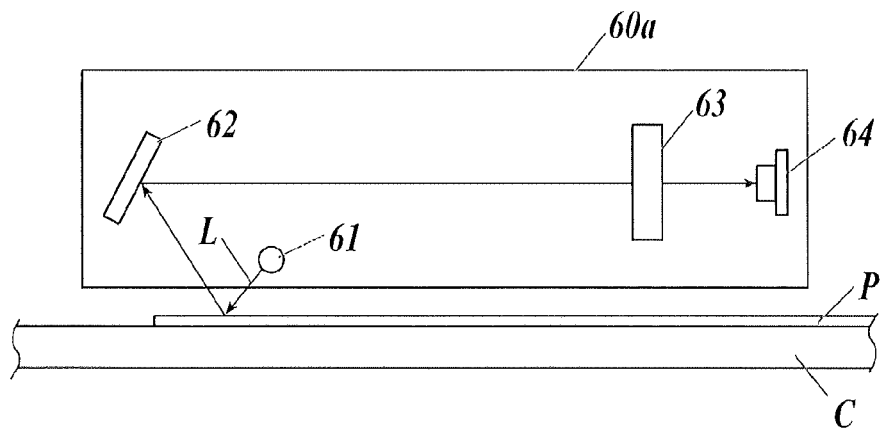
FIG. 4 is a schematic side view showing the configuration of a line sensor unit.

The line sensor unit 60a includes, as shown in FIG. 4, a light source 61 which emits light to the paper P carried on the paper conveyance path C, at least one mirror 62 which reflects the light emitted from the light source 61 and reflected by the paper P in a predetermined direction, a lens 63 which condenses (forms images with) the light reflected by the mirror 62, and a CCD 64 which receives the light condensed by the lens 63.

As the light source 61, for example, a LED (Light Emitting Diode), a CCFL (Cold Cathode Fluorescent Lamp) or a xenon lamp is used. The light source 61 extends in a direction (extending direction) perpendicular to a paper conveyance direction of the paper P. The length of the light source 61 in the extending direction is longer than the width of the paper P to be carried. Light L emitted from the light source 61 is reflected by the color patterns of the color patch formed on the paper P, is reflected by the mirror 62, forms images with the lens 63 and then enters the CCD 64. That is, the CCD 64 receives the light L reflected by the color patterns of the color patch, thereby performing scanning.

The CCD 64 is, what is called, a linear image sensor, and reads the entire image formed on the paper P carried on the paper conveyance path C by moving in relation to the paper P. The CCD 64 performs photoelectric conversion on the light L which has entered the CCD 64, and on the basis thereof, the line sensor unit 60a determines a reflectance which is a ratio of the amount of light received by the CCD 64 (received-light amount) to the amount of light emitted from the light source 61. Then, the line sensor unit 60a generates a signal corresponding to the reflectance and outputs the signal to the control section 10. This signal is a signal which specifies gradations of R, G and B. This signal may be generated from the received-light amount obtained by photoelectric conversion. Alternatively, the line sensor unit 60a may output information indicating the received-light amount obtained by photoelectric conversion to the control section 10, and the control section 10 may obtain the reflectance from the information.

In the embodiment, the CCD 64 performs scanning away from paper, namely, in a noncontact manner. Alternatively, a contact optical reading apparatus such as a CIS may be used.

In the embodiment, the linear image sensor which reads images one-dimensionally is used. Alternatively, an area image sensor which reads images two-dimensionally may be used.

Further, a reference plate readable with the CCD 64 may be provided for shading correction.

The storage section 70 is constituted of a hard disk, a flash memory or the like and stores various data therein. The storage section 70 stores therein, for example, color patch image data and a calibration table described below.

The communication section 80 is constituted of a modem, a LAN (Local Area Network) adapter, a router, a TA (Terminal Adapter) or the like and controls communications between the image forming apparatus 100 and external apparatuses connected to a network N.

Next, an example of the color patch used in the embodiment is described.

Figure 5:
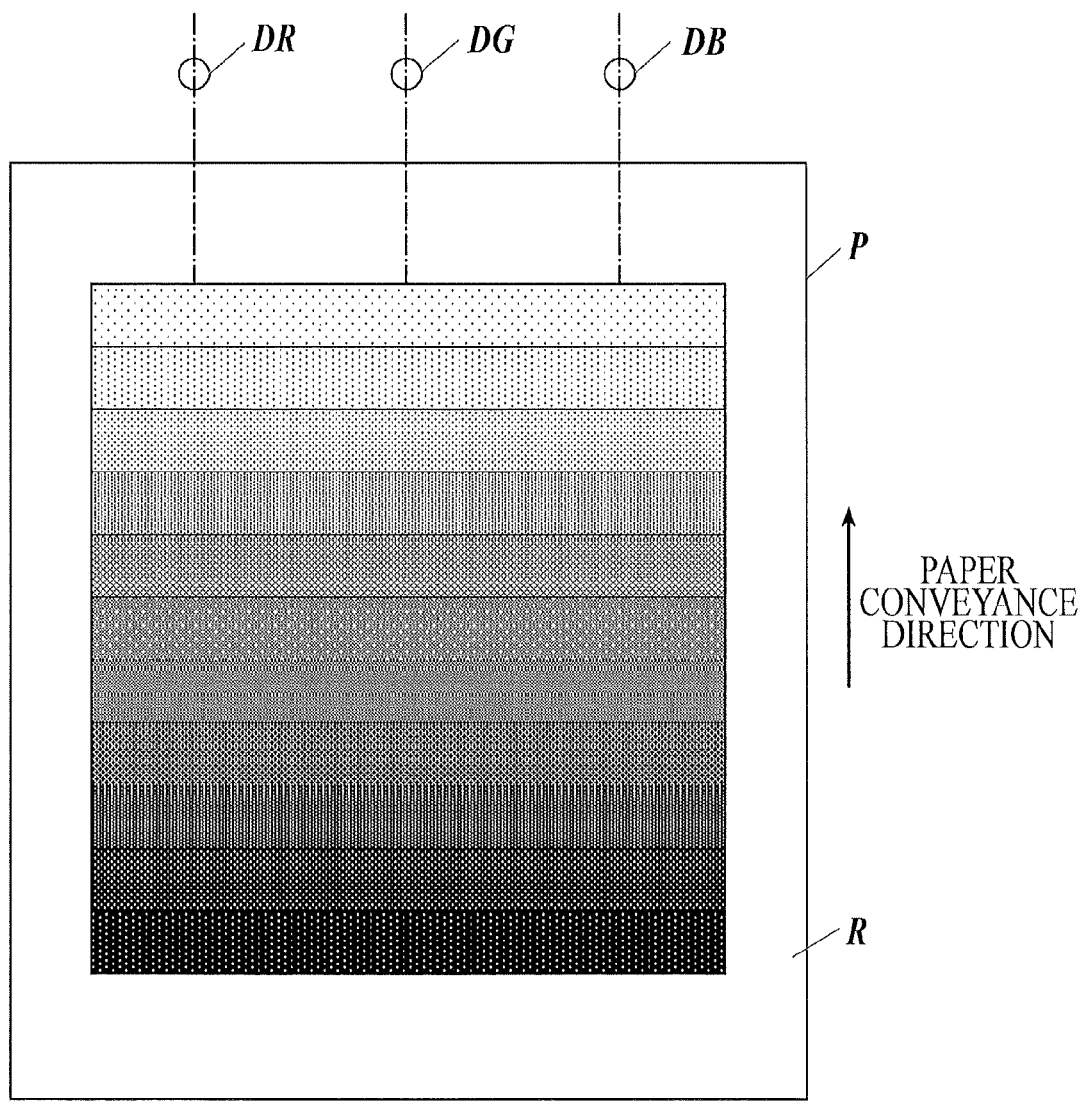
FIG. 5 shows an example of a color patch.

A color patch R formed on paper P is, for example, constituted of color patterns of 228 colors conforming to IT8.7/2. More specifically, as shown in FIG. 5, on a sheet of paper P, belt-shaped color patterns of 11 colors each extending in a direction perpendicular to the paper conveyance direction are continuously formed in the paper conveyance direction, and this is performed for 21 sheets of the paper P each with other 11 colors, whereby the color patch R constituted of color patterns of 228 colors is formed. The length of the color patterns in the longitudinal direction (the direction perpendicular to the paper conveyance direction) is long enough for the single-color sensor (R) 51R, the single-color sensor (G) 51G and the single-color sensor (B) 51B to read each color pattern simultaneously. That is, the length of the color patterns is long enough for each color pattern to pass through the measurement positions DR, DG and DB simultaneously.

In the embodiment, the color patch R is constituted of color patterns of 228 colors conforming to IT8.7/2. However, the format and the number of colors of color patterns are arbitrary and not limited to those described above.

Next, a chart reading process performed by the control section 10 of the image forming apparatus 100 thus configured is described with reference to FIG. 6. The chart reading process is performed, for example, when a user operates the operation display section 20 to make an instruction to calibrate the line sensor unit 60a.

First, the control section 10 performs a stabilization control process (Step S101). More specifically, the image forming section 40 forms a toner image(s) for adjustment on the intermediate transfer belt 43. On the basis of process conditions of the image forming section 40 of the time and the amount of toners attached onto the intermediate transfer belt 43 detected by a sensor (not shown) disposed near the intermediate transfer belt 43, the control section 10 adjusts the process conditions of the image forming section 40 such as charge potentials of the photosensitive drums 41Y, 41M, 41C and 41K, exposures of the laser light sources and development potentials of the developing devices. In addition, the image forming section 40 forms a gradational toner image, the gradations of which are expressed by screen processing, on the intermediate transfer belt 43. The control section 10 calculates an engine gamma curve for area gradation by screen processing using measurement values of the toner image input from the sensor disposed near the intermediate transfer belt 43. The engine gamma curve is a gamma correction curve obtained under the adjusted process conditions.

After performing the stabilization control process, the control section 10 performs a color patch data generating process to generate color patch image data to form the above-described color patch on paper P (Step S102).

Next, the control section 10 performs a color patch forming process to form the color patch on paper P on the basis of the generated color patch image data by controlling the image forming section 40 (Step S103).

Next, the control section 10 performs a single-color sensor reading process to read the color patch, which is formed on the paper P by the image forming section 40, with the single-color sensor (R) 51R, the single-color sensor (G) 51G and the single-color sensor (B) 51B, the paper P being carried inside the first relay unit 50, by controlling the single-color sensor unit 50a (Step S104). At Step S104, the control section 10 obtains, for each color pattern, output values at a point of the color pattern while the color pattern passes through the measurement positions DR, DG and DB. The control section 10 stores the output values obtained from the single-color sensor (R) 51R, the single-color sensor (G) 51G and the single-color sensor (B) 51B, for example, in the RAM.

Next, the control section 10 performs a line sensor reading process to read the color patch on the paper P with the CCD 64, the paper P being carried inside the second relay unit 60, by controlling the line sensor unit 60a (Step S105) and then ends the chart reading process. At Step S105, the control section 10 obtains, for each color pattern, output values about the entire belt-shaped color pattern. That is, the control section 10 obtains, for each color pattern, output values at multiple points of the color pattern. The control section 10 stores the output values obtained from the CCD 64, for example, in the RAM.

Next, a calibration process is described with reference to FIG. 7. The calibration process is a process to be performed, for example, right after the above-described chart reading process is ended.

First, the control section 10 performs a single-color signal combining process (Step S201). With the single-color signal combining process, the output values of the single-color sensor (R) 51R, the single-color sensor (G) 51G and the single-color sensor (B) 51B obtained for each color pattern as described above are combined, thereby being converted into an image signal having the RGB format (color format).

The single-color signal combining process is described with reference to FIG. 8.

First, the control section 10 performs gain adjustment on the obtained output values (Step S301). More specifically, the control section 10 performs gain adjustment, for example, by referring to a gain adjustment table as shown in FIG. 9, the gain adjustment table being stored in the ROM, and multiplying each obtained output value by a coefficient for the type of the single-color sensor which has obtained the output value, namely, by a coefficient for the color of the output value.

Next, the control section 10 performs gamma correction on the gain-adjusted output values (Step S302). The control section 10 performs gamma correction, for example, by multiplying the gain-adjusted output values by a predetermined coefficient.

Next, the control section 10 combines the gain-adjusted and gamma-corrected output values (Step S303) and then ends the single-color signal combining process. More specifically, the control section 10 combines the output values obtained for each color pattern by the single-color sensor (R) 51R, the single-color sensor (G) 51G and the single-color sensor (B) 51B, thereby converting the output values into a signal which specifies gradations of R, G and B. Far more specifically, the control section 10 combines the output value of an R channel obtained from the single-color sensor (R) 51R, the output value of a G channel obtained from the single-color sensor (G) 51G and the output value of a B channel obtained from the single-color sensor (B) 51B, thereby converting the output values into an RGB output value. Thus, the signals output from the single-color sensors are converted into a signal having the same signal format as the signals output from the CCD 64.

Thus, the control section 10 functions as an image signal conversion section which converts first signals output from a first image reading apparatus into a signal (after-conversion first signal) having a signal format of a second signal(s).

After performing the single-color signal combining process in this way, the control section 10 performs a color signal correction process as shown in FIG. 7 (Step S202). With the color signal correction process, the output values of the CCD 64 obtained as described above are corrected to create a calibration table described below.

The color signal correction process is described with reference to FIG. 10.

First, the control section 10 performs gamma correction on the obtained output values (Step S401). The control section 10 performs gamma correction, for example, by multiplying the output values obtained for each color pattern by a predetermined coefficient.

Next, the control section 10 performs an average value calculation process to obtain the average of the output values for each color pattern (Step S402) and then ends the color signal correction process. More specifically, the control section 10 obtains, for each color pattern, the average of the output values obtained as described above about the entire belt-shaped color pattern.

After performing the color signal correction process in this way, the control section 10 creates a calibration table as shown in FIG. 7 (Step S203). More specifically, the control section 10 creates a calibration table to adjust the corrected output values (i.e. averages) output from the CCD 64 to the output values of the image signals having the RGB format output from the single-color sensor (R) 51R, the single-color sensor (G) 51G and the single-color sensor (B) 51B.

Thus, the control section 10 functions as a calibration section which performs calibration in such a way that the output values of second signals output from a second image reading apparatus are adjusted to the output values of after-conversion first signals obtained by the conversion with the image signal conversion section.

The control section 10 stores the created calibration table in the storage section 70 (Step S204) and then ends the calibration process.

As described above, according to the embodiment, the control section 10 performs calibration with the single-color sensor unit 50a and the line sensor unit 60a which read in-line the color patch R formed on paper P by the image forming apparatus 100 which forms images on paper. The single-color sensor unit 50a has the single-color sensor (R) 51R, the single-color sensor (G) 51G and the single-color sensor (B) 51B which read the color patch R and output the reading results as first signals. The line sensor unit 60a has the CCD 64 which reads the color patch R and outputs the reading result(s) as a second signal(s) having a signal format different from a signal format of the first signals. The control section 10 converts the first signals output from the single-color sensor unit 50a into a signal (after-conversion first signal) having the signal format of the second signal. The control section 10 performs calibration in such a way that an output value of the second signal output from the line sensor unit 60a is adjusted to an output value of the after-conversion first signal. Consequently, calibration can be performed in such a way that second signals are adjusted to first signals (after-conversion first signals) of an image reading apparatus which outputs signals having high reliability. Hence, calibration with a colorimeter is unnecessary, and therefore an image reading apparatus can be calibrated without reducing productivity. Further, for example, in the case where the second image reading apparatus is optionally installed in the image forming apparatus, the work time to install the second image reading apparatus can be shortened, and also the calibration work can be easily performed.

Further, according to the embodiment, the single-color sensor (R) 51R, the single-color sensor (G) 51G and the single-color sensor (B) 51B are single-color sensors which read the color patch R at their respective positions and output signals of their respective channels, thereby obtaining signals having high S/N (Signal to Noise ratio). Therefore, first signals having higher reliability can be obtained.

Further, according to the embodiment, the single-color sensors are: the single-color sensor (R) 51R which emits red light to the color patch R, receives the light reflected by the color patch R, and outputs a signal corresponding to the amount of the received light; the single-color sensor (G) 51G which emits green light to the color patch R, receives the light reflected by the color patch R, and outputs a signal corresponding to the amount of the received light; and the single-color sensor (B) 51B which emits blue light to the color patch R, receives the light reflected by the color patch R, and outputs a signal corresponding to the amount of the received light. Therefore, first signals can be obtained with a simple method.

Further, according to the embodiment, the single-color sensor (R) 51R, the single-color sensor (G) 51G and the single-color sensor (B) 51B are disposed in the direction perpendicular to the paper conveyance direction. The color patch R is constituted of a color pattern(s) having a length enough for the single-color sensor (R) 51R, the single-color sensor (G) 51G and the single-color sensor (B) 51B to read the color pattern simultaneously. Therefore, an installation space for the single-color sensors can be small.

Further, according to the embodiment, the CCD 64 is a line sensor which reads the color patch R in full color and outputs the reading result(s) as a color signal(s). Therefore, a color profile can be properly created.

Further, according to the embodiment, the color patch R is constituted of color patterns of 228 colors conforming to IT8.7/2. Therefore, calibration can be properly performed.

The above embodiment is an example of the image forming apparatus of the present invention, and hence the present invention is not limited thereto. The detailed configurations and actions of the functional sections and the like which constitute the image forming apparatus can be appropriately modified.

Further, in the embodiment, the calibration table to adjust the output values output from the CCD 64 to the output values of the image signals having the RGB format output from the single-color sensor (R) 51R, the single-color sensor (G) 51G and the single-color sensor (B) 51B is created, and the CCD 64 is calibrated using this calibration table. Alternatively, the CCD 64 may be calibrated by matrix operation using the output values of the CCD 64 and the output values of the single-color sensor (R) 51R, the single-color sensor (G) 51G and the single-color sensor (B) 51B.

Further, in the embodiment, with regard to the single-color sensors, one light receiving element is provided for one light source. Alternatively, one light receiving element may be provided for three light sources, whereby one light receiving element is shared between three light sources and the one light receiving element receives light from the three light sources.

Further, in the embodiment, a hard disk, a semiconductor nonvolatile memory or the like is used as a computer readable storage medium in which the programs to perform the processes are stored. However, this is not a limitation, and hence, for example, a portable storage medium such as a CD-ROM is also usable as the computer readable storage medium. Further, a carrier wave is usable as a medium to provide data of the programs to perform the processes via a communication line.

This application is based upon and claims the benefit of priority under 35 USC 119 of Japanese Patent Application No. 2014-004994 filed on Jan. 15, 2014, the entire disclosure of which, including the specification, claims, drawings and abstract, is incorporated herein by reference in its entirety.

What is claimed is:

1. A calibration apparatus comprising:
a calibration section which performs calibration with a first image reading apparatus and a second image reading apparatus which read in-line a color patch formed on paper by an image forming apparatus which forms an image on paper; and
an image signal conversion section, wherein
the first image reading apparatus includes a first device which reads the color patch and outputs a result of the reading as a first signal,
the second image reading apparatus includes a second device which reads the color patch and outputs a result of the reading as a second signal having a signal format different from a signal format of the first signal,
the image signal conversion section converts the first signal into an after-conversion first signal having the signal format of the second signal, and
the calibration section performs the calibration in such a way that an output value of the second signal is adjusted to an output value of the after-conversion first signal.

2. The calibration apparatus according to claim 1, wherein the first device is constituted of a plurality of single-color sensors which read the color patch at different positions and output the first signals of different channels.

3. The calibration apparatus according to claim 2, wherein the single-color sensors are constituted of:
a first single-color sensor which emits red light to the color patch, receives the light reflected by the color patch, and outputs the first signal corresponding to an amount of the received light;
a second single-color sensor which emits green light to the color patch, receives the light reflected by the color patch, and outputs the first signal corresponding to an amount of the received light; and
a third single-color sensor which emits blue light to the color patch, receives the light reflected by the color patch, and outputs the first signal corresponding to an amount of the received light.

4. The calibration apparatus according to claim 2, wherein the single-color sensors are disposed in a direction perpendicular to a conveyance direction of the paper, and
the color patch is constituted of a color pattern having a length enough for the single-color sensors to read the color pattern simultaneously.

5. The calibration apparatus according to claim 1, wherein the second device is constituted of a line sensor which reads the color patch in full color and outputs the result of the reading as the second signal which is a color signal.

6. The calibration apparatus according to claim 1, wherein the color patch is constituted of color patterns of 228 colors conforming to IT8.7/2.

7. A method for calibrating an image reading apparatus, the method comprising:
forming a color patch on paper with an image forming apparatus which forms an image on paper;
obtaining a first signal by reading in-line the color patch with a first device of a first image reading apparatus;
obtaining a second signal having a signal format different from a signal format of the first signal by reading in-line the color patch with a second device of a second image reading apparatus;
converting the first signal into an after-conversion first signal having the signal format of the second signal; and
performing calibration in such a way that an output value of the second signal is adjusted to an output value of the after-conversion first signal.

* * * * *